(12) United States Patent
Kozak (10) Patent No.: US 10,400,949 B1
(45) Date of Patent: Sep. 3, 2019

(54) HANGER SYSTEM

(71) Applicant: Stephanie Kozak, Goshen, IN (US)

(72) Inventor: Stephanie Kozak, Goshen, IN (US)

( * ) Notice: Subject to any disclaimer, the term of this patent is extended or adjusted under 35 U.S.C. 154(b) by 0 days.

(21) Appl. No.: 16/361,391

(22) Filed: Mar. 22, 2019

Related U.S. Application Data (60) Provisional application No. 62/711,794, filed on Jul. 30, 2018.

(51) Int. Cl.
*F16M 13/02* (2006.01)
*F16M 11/04* (2006.01)
*A47G 1/16* (2006.01)

(52) U.S. Cl.
CPC .......... *F16M 13/02* (2013.01); *A47G 1/1606* (2013.01); *F16M 11/041* (2013.01)

(58) Field of Classification Search
CPC ..... F16M 13/02; F16M 11/041; A47G 1/1606
USPC ............ 248/225.11, 223.41, 225.51, 224.61, 248/224.8, 222.41, 222.11, 205.1, 224.51
See application file for complete search history.

(56) References Cited

U.S. PATENT DOCUMENTS

| | | | | |
|---|---|---|---|---|
| 606,208 A * | 6/1898 | Gutmann | ............... | B60N 3/102 248/311.2 |
| 1,252,207 A * | 1/1918 | Walker | ..................... | 248/221.11 |
| 3,529,799 A * | 9/1970 | Schaefer | .............. | A47G 1/1613 248/496 |
| 3,622,116 A * | 11/1971 | Fellows | ............... | A47G 1/1606 248/224.51 |
| 4,176,580 A * | 12/1979 | Gallegos | .................. | G10G 5/00 248/224.51 |
| 4,620,736 A * | 11/1986 | Shanks | .................... | B60D 1/06 224/517 |
| 5,026,016 A * | 6/1991 | Lisowski | ................ | F16B 21/09 248/225.11 |
| D329,192 S * | 9/1992 | Susac | ............................ | D8/349 |
| 5,425,524 A * | 6/1995 | Messina, Jr. | ......... | A47G 1/1606 248/475.1 |
| 5,433,416 A * | 7/1995 | Johnson | ............... | B65D 23/003 248/475.1 |
| 5,806,822 A * | 9/1998 | Schulz | ................... | A61B 90/50 211/70.6 |
| 5,833,205 A * | 11/1998 | Lindbeck | .............. | B65D 88/66 248/671 |
| 6,082,688 A * | 7/2000 | Wilson | ................... | A01K 97/10 248/222.11 |
| 6,142,892 A * | 11/2000 | Dennis | ................ | A63B 63/004 248/74.3 |

(Continued)

*Primary Examiner* — Kimberly T Wood
(74) *Attorney, Agent, or Firm* — Botkin & Hall, LLP (57) ABSTRACT

A hanger system has a mount and a removable insert. The mount is formed from a single material and has mounting apertures to affix the mount to a wall or other vertical surface. The mount has a pocket to receive a keystone portion of the insert. The insert is formed from a single material and has an aperture extending therethrough that allows a separate device or component to be affixed. The insert mates to the mount when the keystone portion of the insert is received by a keystone pocket in the mount. The mount has tapered surfaces that contact complimentary tapered surfaces on the keystone portion of the insert. The user installs the mount to the surface with fasteners in the mounting apertures. The insert is mated to the mount by placing the keystone portion in the keystone pocket.

20 Claims, 6 Drawing Sheets

(56) References Cited

U.S. PATENT DOCUMENTS

| | | | | |
|---|---|---|---|---|
| 6,457,687 B1* | 10/2002 | Daoud | ............... | H02G 3/088 248/221.11 |
| 6,481,679 B1* | 11/2002 | Bennett | ............... | A61G 13/101 248/223.41 |
| 6,779,766 B1* | 8/2004 | Hade | ............... | F16M 11/041 108/69 |
| 6,811,348 B1* | 11/2004 | Meyer | ............... | A42B 3/04 403/325 |
| 7,273,203 B2* | 9/2007 | Carnevali | ............... | E05B 65/006 248/221.11 |
| 8,011,071 B2* | 9/2011 | O'Brien | ............... | A61M 16/1075 224/197 |
| 8,096,026 B2* | 1/2012 | Bevirt | ............... | F16M 11/40 24/335 |
| D753,982 S* | 4/2016 | Guirlinger | ............... | D8/349 |
| 10,258,136 B2* | 4/2019 | Fiorello | ............... | A45F 5/021 |
| 2003/0218110 A1* | 11/2003 | Burgess | ............... | E04B 5/12 248/220.1 |
| 2006/0186304 A1* | 8/2006 | McGee | ............... | A47G 1/1606 248/476 |
| 2006/0261223 A1* | 11/2006 | Orndorff, II | ............... | E04B 2/7409 248/220.1 |
| 2008/0083865 A1* | 4/2008 | Matsui | ............... | F16M 11/10 248/496 |
| 2010/0090857 A1* | 4/2010 | Varieur | ............... | G08B 5/38 340/693.9 |

* cited by examiner

HANGER SYSTEM

CROSS REFERENCE TO RELATED APPLICATIONS

This application claims the benefit of U.S. Provisional Application No. 62/711,794, filed Jul. 30, 2018, the disclosures of which are hereby incorporated by reference.

BACKGROUND OF THE INVENTION

This present disclosure relates to flexible hanging systems. There is a frequent and common need to hang devices on surfaces, either horizontal or vertical. Some devices provide simple and straightforward hanging features and are able to be hung easily. Others may require additional components or brackets to be hung properly. Due to space constraints, some users desire flexibility to be able to attach several different devices to the surface(s). Some users mount rails, tracks, or even pegboard to allow flexibility in mounting, but these are limited to the accessories or hooks that are compatible. An improved hanging and mounting system is needed.

SUMMARY OF THE INVENTION

The present disclosure describes a system that has a mount and a removable insert. The mount is designed to be affixed to a surface, such as a wall, ceiling, or other surface that can support weight. The removable insert is designed to be used as a receiver to affix an external device, such as a hook, shelf, basket, or other device. The removable insert can also be used by itself. The mount has a tapered pocket that receives a keystone shaped portion on the insert. The insert includes a central aperture that can receive a fastener that is used to attach the external device. The insert has a knob shaped portion that can be used for hanging or mounting other objects.

BRIEF DESCRIPTION OF THE DRAWINGS

A preferred embodiment of this invention has been chosen wherein:

FIG. 6 is a section view 6-6 of the mount as shown in FIG. 5a.

DESCRIPTION OF THE PREFERRED EMBODIMENT

Figure 1:
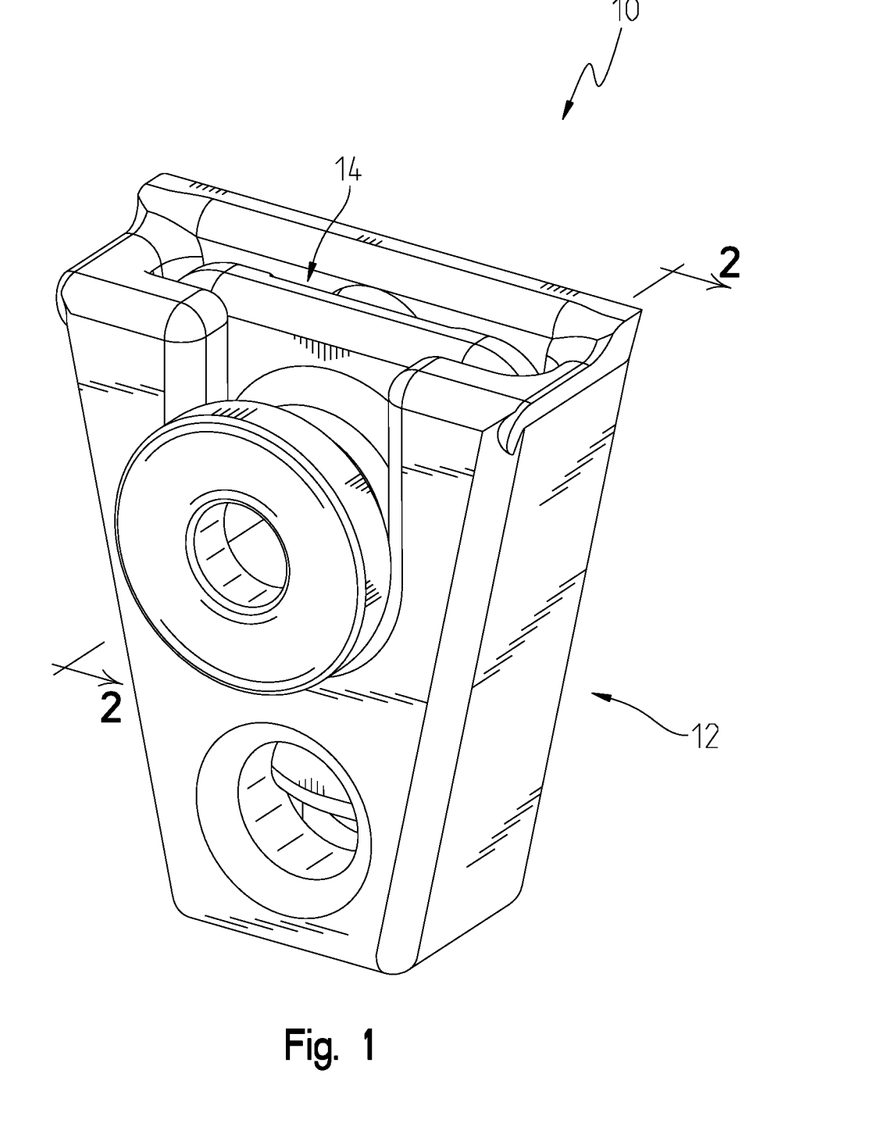
FIG. 1 is an isometric view of the insert mated to the mount.
Figure 2:
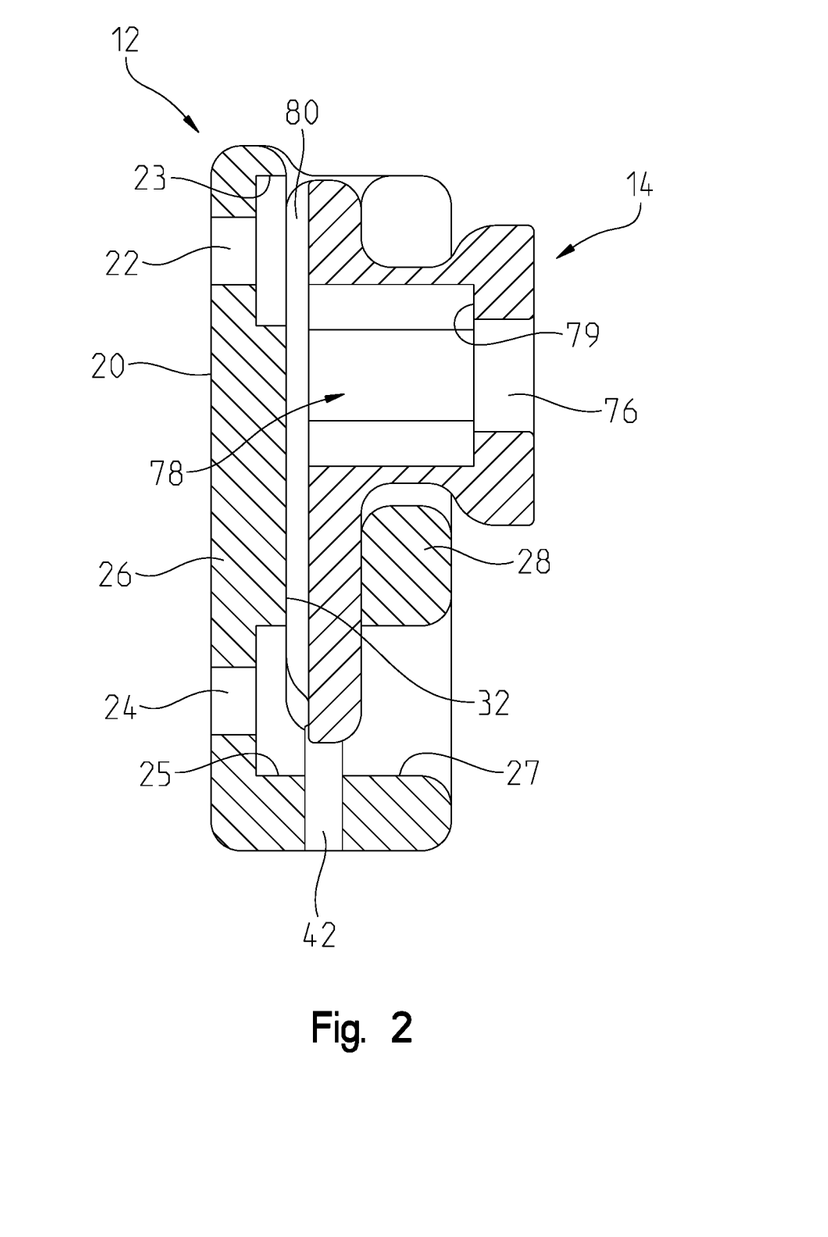
FIG. 2 is a section view 2-2 of the insert and mount as shown in FIG. 1.
Figure 3:
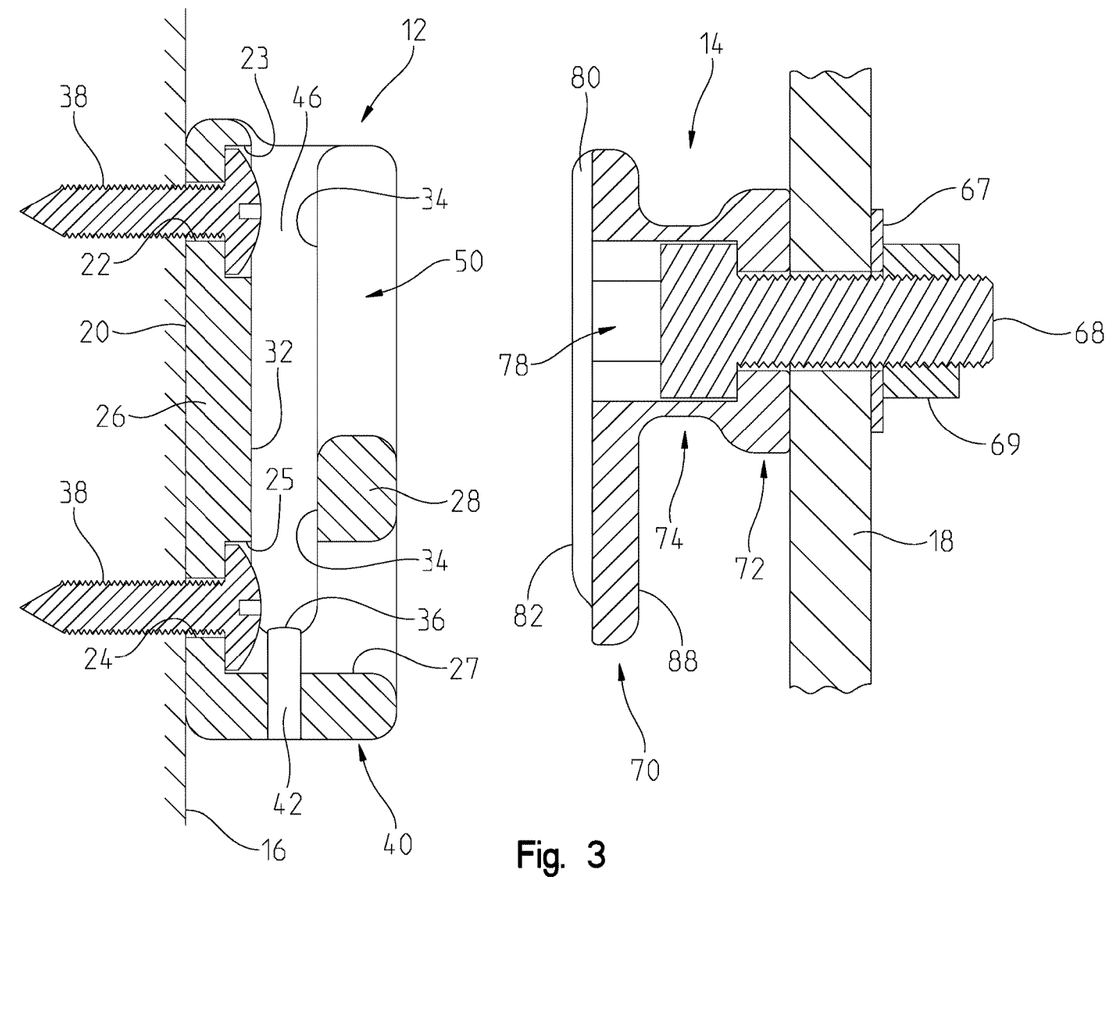
FIG. 3 is a section view of the mount and insert along section line 2-2 with the insert affixed to a device and the mount affixed to a wall.

A hanger system 10, shown in FIGS. 1-6, is comprised of a mount 12 and an insert 14. The mount 12, shown in FIG. 3, is designed to be affixed to a surface 16 (including, but not limited to, a wall, ceiling, or cabinet). The insert 14, shown in FIGS. 4a and 4b, is designed to receive additional components, such as shelves, hooks, baskets, lights, or other devices 18 that the user may desire. Other devices 18 are shown affixed to the insert 14 in FIG. 3. The insert 14 mates to the mount 12, shown in FIGS. 1-3, to attach the devices to the surface 16.

Figure 5A:
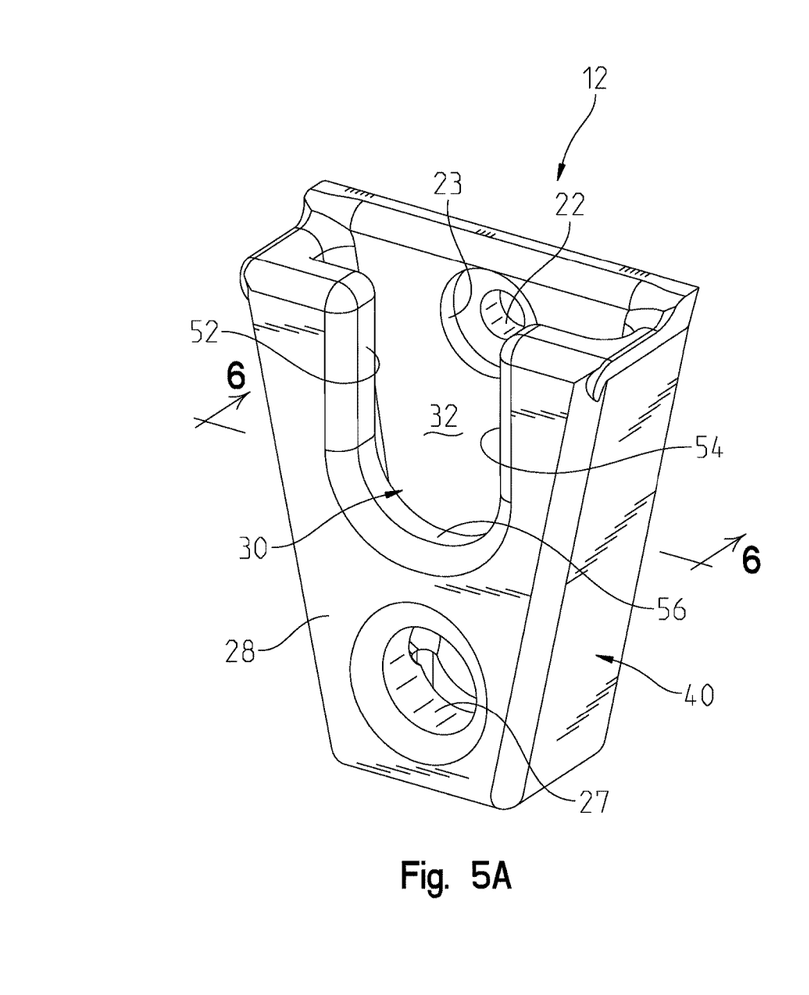
FIG. 5a is a front isometric view of the mount.
Figure 5B:
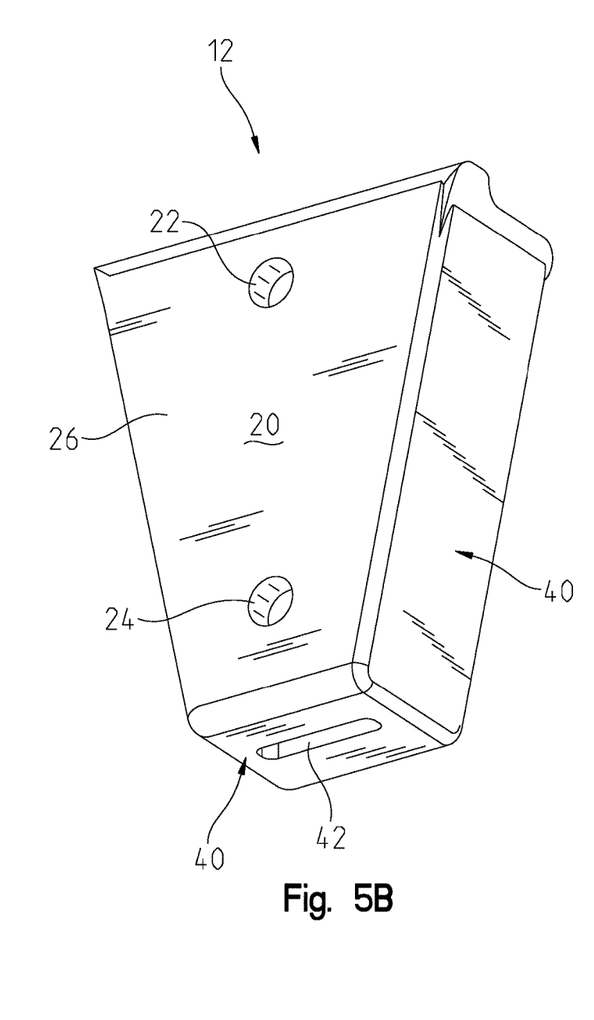
FIG. 5b is a rear isometric view of the mount.
Figure 6:
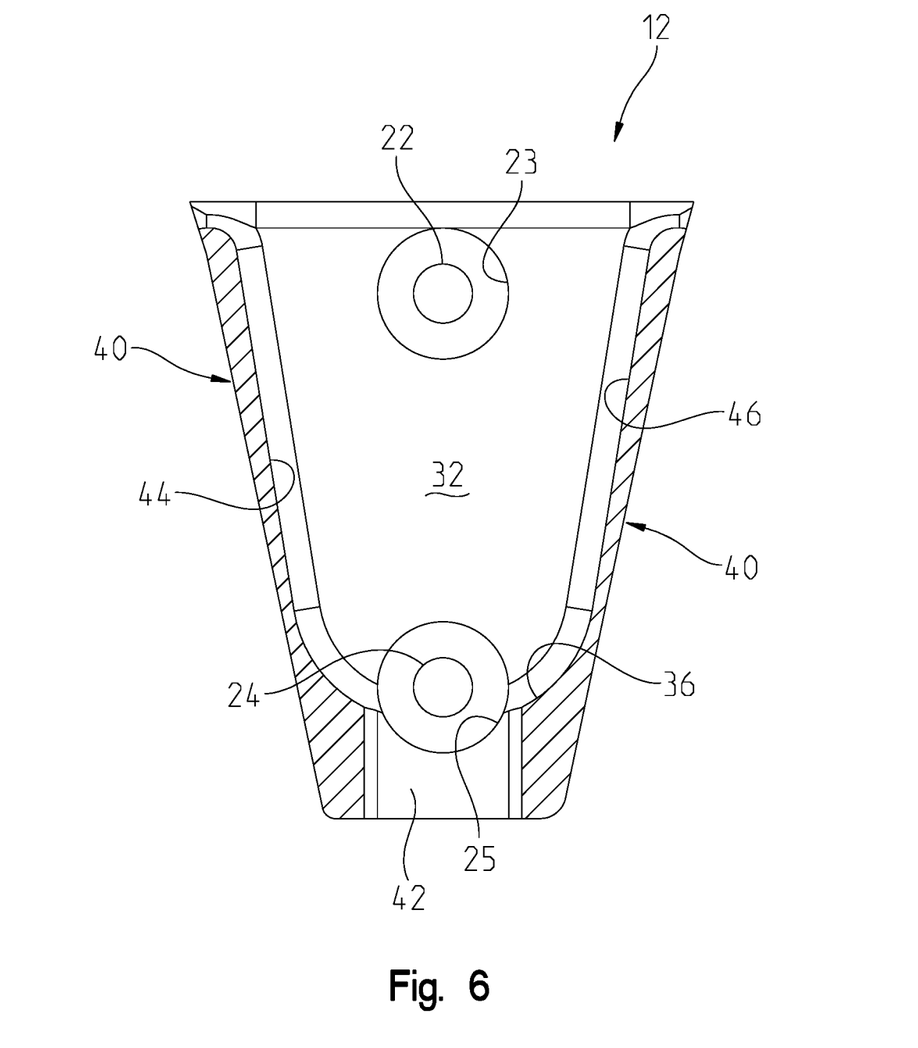

The mount 12, shown in FIGS. 5a and 5b, is commonly formed from a single component or material, such as plastic or metal. The mount 12 is shown as a unitary construction, all formed from a single material. It is contemplated that it could be made from multiple materials, have metal inserts, or use coatings, depending on the needs of the user. The mount 12 has a mounting surface 20 that will contact the surface 16 when affixed thereto. The mount 12 has an upper mounting aperture 22 and a lower mounting aperture 24 that extend through the back wall portion 26. As shown, the mounting apertures 22, 24 are perpendicular to the back wall portion 26. The mounting apertures 22, 24 are inset with a clearance surface 23, 25 to allow the head of a screw of other fastener 38 to remain flush or not protrude beyond an outward facing surface 32. The mount 12 has a front wall portion 28 that is spaced from the back wall portion 26 to form a keystone socket 30. The back wall portion 26 has the outward facing surface 32 that is parallel to an inward facing surface 34 on the front wall portion 28. The outward facing surface 32 is spaced from the inward facing surface 34 to define the size of the keystone socket 30. The outward facing surface 32 and inward facing surface 34 meet at a bottom socket surface 36 that is located on a bridge wall portion 40. As shown, the lower mounting aperture 24, clearance surface 25, and clearance aperture 27 interrupt the bottom pocket surface. A drain hole 42 extends through the bridge wall portion 40 to allow debris, water, or other contaminants to exit the mount 12 when it is affixed on a vertical (or mostly vertical) surface. The bridge wall portion 40 extends on either side of the keystone socket 30, with tapered surfaces 44, 46 meeting at the bottom socket surface 36. The bridge wall portion 40 is "U" or "V" shaped with the tapered surfaces 44, 46 located thereon. The tapered surfaces 44, 46 are angled such that they are closest nearest the bottom socket surface 36.

The front wall portion 28 includes a notch 50 and clearance aperture 27 that allows access to the mounting apertures 22, 24. The notch 50 has a width defined by parallel surfaces 52, 54 that meet at a radiused surface 56 that defines the bottom of the notch 50.

Figure 4A:
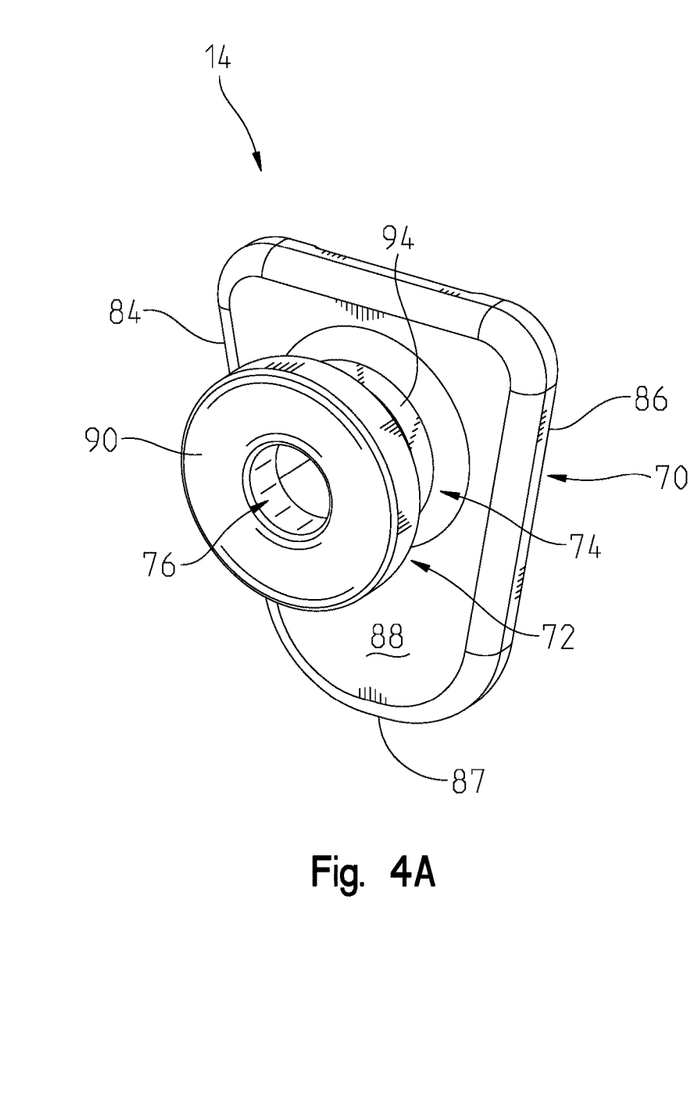
FIG. 4a is a front isometric view of the insert.
Figure 4B:
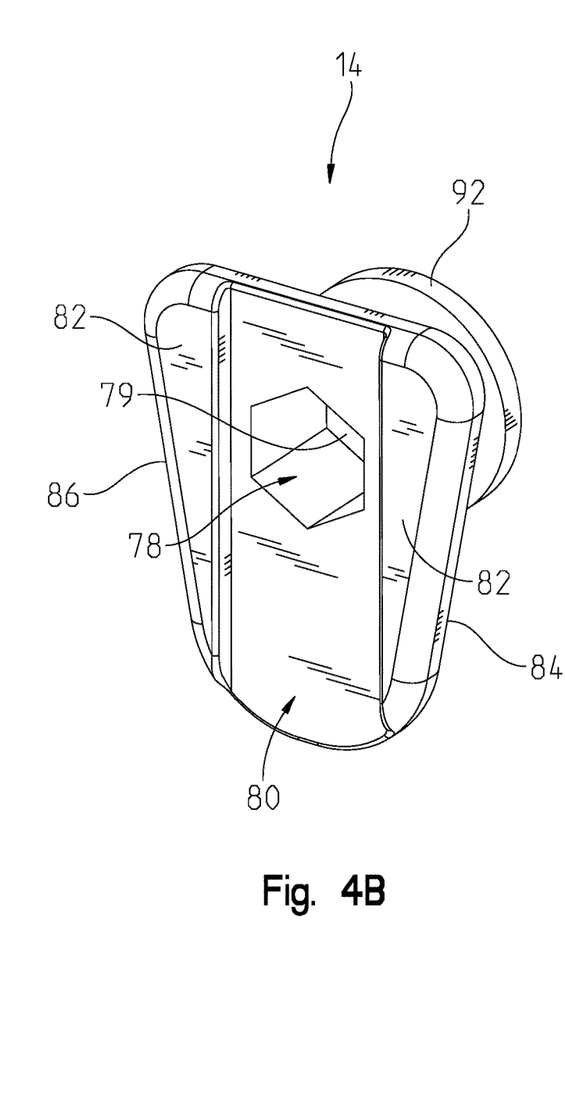
FIG. 4b is a rear isometric view of the insert.

The insert 14, as previously described, is designed to mate with the mount 12. As mated, the mount 12 does not rotate with respect to the insert 14. As with the mount 12, the insert 14 is commonly formed from a single component or material, such as plastic or metal. The insert 14 is shown as a unitary construction, all formed from a single material. It is contemplated that it could be made from multiple materials, have metal inserts, or use coatings, depending on the needs of the user. The insert 14 has a keystone portion 70 and a knob portion 72. A connecting portion 74 connects the keystone portion 70 and knob portion 72. A central aperture 76 extends through the portions 70, 72, and 74. The keystone portion 70 fits into the keystone socket 30. The shape of the keystone portion 70 and keystone socket 30 prevent rotation between the insert 14 and mount 12. The central aperture 76 has a fastener pocket 78 that will receive the head of an external fastener 68 or a nut with a complimentary size and shape. The fastener pocket 78 extends into the keystone portion 70 and terminates at a fastener surface 79. While the fastener pocket 78 is shown as a hexagonal six-sided pocket, it is contemplated that other sizes or shapes are used, such as a square or twelve-sided pocket. It is further contemplated that instead of the fastener pocket 78, the insert 14 uses a threaded insert that is pressed in or integrally formed there-with. It may take the form of a threaded and tapped aperture or be a threaded shaft that extends outwardly from the knob portion 72. The fastener pocket 78 prevents unwanted rotation of that portion of the external fastener 68 when the user is tightening down an external device to affix it to the insert 14.

The keystone portion 70 has a channel 80 that interrupts an inward facing surface 82. The central aperture 76 extends through the channel 80. The channel 80 provides additional clearance or gap in the event that the fasteners 38 extend beyond the outward facing surface 32. Fasteners 38 that protrude beyond the outward facing surface 32 are shown in FIG. 3. On the sides of the keystone portion 70 are keystone surfaces 84, 86. The keystone surfaces 84, 86 are tapered the same to be complimentary to the tapered surfaces 44, 46. A bottom insert surface 87 is located between the keystone surfaces 84, 86. Located opposite the inward facing surface 82 is an outward facing surface 88 that defines the thickness of the keystone portion 70. The outward facing surface 88 is parallel to the inward facing surface 82. The thickness of the keystone portion 70 matches the keystone socket 30, such that when the insert 14 is mated to the mount 12, the insert 14 fits snugly and does not allow relative motion between the two parts. Further, as mated, the front wall portion 28 provides support to prevent any cantilevered weight on the insert from pulling the insert 14 away from the mount 12. The only way to remove the insert 14 from the mount 12 is to slide it upwardly in a motion parallel to the outward facing surface 32.

The knob portion 72 has a contacting surface 90 that is shown as flat. As shown, the central aperture 76 is perpendicular to the contacting surface 90, channel 80, and inward facing surface 82. The contacting surface 90 may have knurled, textured, or other properties, depending on the needs of the user. The contacting surface 90 may include a channel, key, protrusions, or other features to prevent rotation of whatever external device is affixed thereto. The contacting surface 90 is designed to contact any accessory, hook, shelf, or device that may be affixed to the insert 14. The knob portion 72 is round and bobbin shaped with a larger diameter 92 nearest the contacting surface 90. The connecting portion 74 has a smaller diameter 94. The smaller diameter 94 provides clearance to the radiused surface 56 and can also serve as a groove to hang a bag, purse, coat, or other object that could be hung from a knob shape. As can be shown in FIG. 2, the connecting portion 74 is clear of the notch 50.

To use the system 10, the user selects a location on the surface 16 that can support weight. This is commonly a wall stud or other structural material. The user may use a drywall anchor, concrete anchor, or simply thread the fasteners 38 into the surface, depending on the amount of weight the user will be placing on the system 10. The user will drive fasteners 38 through the mounting apertures 22 and 24 to secure the mount 12 with the mounting surface 20 contacting surface 16. In the event the mount 12 is located on a vertical wall, the user mounts the mount 12 such that the drain hole 42 faces downward and the keystone socket 30 faces upward. Next, the user attaches whatever external device 18 they desire to the insert 14 with the external fastener 68, which may include a washer 67 and nut 69. In the event the external device requires a specific orientation, the user will attach it in a way that anticipates the bottom insert surface 87 facing downward. To mate the insert 14 to the mount 12, the user slides the keystone portion 70 into the keystone socket 30. As the keystone portion 70 extends into the keystone socket, it becomes captured between the front wall portion 28, back wall portion 26, and bridge wall portion 40. The insert 14 is fully seated in the mount 12 when the tapered surfaces 44, 46 contact keystone surfaces 84, 86. Because they are tapered, the insert 14 is centered in the mount 12 with biased contact between the tapered surfaces 44, 46 and keystone surfaces 84, 86, preventing undesired looseness or rattling between the two parts. In the event the system 10 is used in the horizontal position (where surface 16 is horizontal or mostly horizontal), friction between the inward facing surface 34 and outward facing surface 88 maintains the position of the insert 14 in the mount 12.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A hanger system for removably affixing an external device to a substantially vertical surface, said hanger system comprising:

a single piece mount having a back wall portion integrally connected to a front wall portion through a U-shaped bridge wall portion, said U-shaped bridge wall portion having tapered surfaces facing each other and extending into a bottom socket surface, said back wall portion, said front wall portion, and said U-shaped bridge wall portion forming a keystone socket, said back wall portion having mounting apertures extending therethrough to affix said single piece mount to said substantially vertical surface, said front wall portion having a clearance aperture aligned with one of said mounting apertures in said back wall portion, said bottom socket surface interrupted by said clearance aperture;

a single piece insert having a keystone portion connected to a knob portion through a narrowed connecting portion, said insert having a central aperture extending through said keystone portion, said knob portion, and said connecting portion, said keystone portion having keystone surfaces being complimentary to said tapered surfaces in said mount, said keystone surfaces meeting at a bottom insert surface, said bottom insert surface complimentary to said bottom socket surface, said central aperture having a fastener pocket extending into said keystone portion and terminating at a fastener surface, said knob portion for affixing to said external device with a fastener extending through said central aperture and said external device; and when said keystone socket receives said keystone portion, said keystone surfaces are in biased contact with said tapered surfaces and said mounting apertures are obscured by said keystone portion and said single piece mount is fixed from rotation with respect to said single piece insert.

2. The hanger system in claim 1, wherein said central aperture of said keystone portion having the fastener pocket includes a hexagonal fastener retainer portion aligned with said central aperture.

3. The hanger system in claim 1, wherein said back wall portion having an outward facing surface and said front wall portion having an inward facing surface spaced from and parallel to said outward facing surface.

4. The hanger system of claim 3, further comprising a channel located on said keystone portion to provide clearance for fasteners located in said mounting apertures that extend beyond said outward facing surface.

5. The hanger system of claim 1, wherein said U-shaped bridge wall portion having a drain hole extending through said bottom socket surface.

6. The hanger system of claim 1, wherein said knob portion has a contacting surface parallel to a mounting surface on said back wall portion when said insert is mated to said mount.

7. The hanger system of claim 1, wherein said front wall portion having a notch, said narrowed connecting portion located in and clear of said notch when said mount receives said insert.

8. A hanger system comprising:
a mount having a back wall portion integrally connected to a front wall portion through a bridge wall portion, said bridge wall portion having tapered surfaces facing each other, said back wall portion, said front wall portion, and said bridge wall portion forming a keystone socket, said back wall portion having mounting apertures extending therethrough, said front wall portion having a clearance aperture aligned with one of said mounting apertures in said back wall portion;
an insert having a keystone portion connected to a knob portion through a narrowed connecting portion, said insert having a central aperture extending through said keystone portion, said knob portion, and said connecting portion, said keystone portion having keystone surfaces being complimentary to said tapered surfaces in said mount; and
when said keystone socket receives said keystone portion, said keystone surfaces are in biased contact with said tapered surfaces and said insert is locked from rotation with respect to said mount.

9. The hanger system in claim 8, wherein said central aperture having a fastener pocket extending into said keystone portion and terminating at a fastener surface.

10. The hanger system in claim 9, wherein said central aperture of said keystone portion having the fastener pocket includes a hexagonal fastener retainer portion.

11. The hanger system in claim 8, wherein said back wall portion having an outward facing surface and said front wall portion having an inward facing surface spaced from and parallel to said outward facing surface.

12. The hanger system in claim 8, wherein said mounting apertures are obscured by said keystone portion when said insert is mated to said mount.

13. The hanger system of claim 12, further comprising a channel located on said keystone portion to provide clearance for fasteners located in said mounting apertures that extend beyond said outward facing surface.

14. The hanger system of claim 8, wherein said bridge wall portion having a drain hole extending therethrough.

15. The hanger system of claim 8, wherein said knob portion has a contacting surface parallel to a mounting surface on said back wall portion when said insert is mated to said mount.

16. The hanger system of claim 8, wherein said front wall portion having a notch, said narrowed connecting portion located in said notch when said mount receives said insert.

17. A hanger system for an external device, said hanger system comprising:
a unitary mount having a first mounting aperture perpendicularly extending through a front wall portion and a back wall portion, said front wall portion and said back wall portion being parallel and connected by a bridge wall portion to form a keystone socket, said bridge wall portion having a drain aperture extending therethrough;
a unitary insert having a keystone portion integrally connected to a knob portion through a connecting portion, said unitary insert having a central aperture perpendicularly extending through said keystone portion, said knob portion, and said connecting portion, said keystone portion having a clearance channel that creates a gap between said back wall portion when said unitary insert is mated to said unitary mount, said unitary insert affixable to said external device when a device fastener extends through said central aperture and affixes said unitary insert to said external device.

18. The hanger system of claim 17, wherein said unitary mount and said unitary insert are formed from plastic.

19. The hanger system of claim 17, wherein said unitary mount includes a second mounting aperture parallel to said first mounting aperture.

20. The hanger system of claim 17, wherein said unitary insert is fixed from rotation with respect to said unitary mount when said keystone socket receives said keystone portion.

* * * * *